Patented May 8, 1945

2,375,501

UNITED STATES PATENT OFFICE 2,375,501

VITAMIN A CONTAINING PREPARATION AND THE MANNER OF ITS PRODUCTION

Boris T. Sokoloff, Bloomfield, N. J., assignor to World Products Corp., New York, N. Y., a corporation of New York No Drawing. Application September 21, 1943, Serial No. 503,242

5 Claims. (Cl. 167—81)

My present invention relates generally to a preparation which contains vitamin A or which may serve as a carrier therefor and, coordinately, to the manner of its production from animal liver.

This application is a continuation in part of my copending application, Serial No. 466,221, filed November 19, 1942.

Among the more general objects of my invention are: a vitamin A containing substance the stability of whose vitamin A potency is relatively high; a vitamin A containing preparation or substance which is inexpensive to produce; an effective and inexpensive carrier for vitamin A containing substance such as fish liver oil.

A specific object of my invention is to provide a vitamin A containing preparation or substance which possesses strong anti-oxidant properties.

A further object of my invention is to provide a vitamin A containing substance or preparation in the form of a dry powder and, more particularly, a powder which possesses anti-oxidant properties.

A further object of my invention is to provide a preparation which has characteristics which render it peculiarly adaptable for and highly serviceable as a carrier for vitamin A containing substances such as fish liver oil.

Another object of my invention is to provide a vitamin A containing preparation which has characteristics which render it peculiarly adaptable or highly serviceable as a carrier for vitamin A containing substances such as fish liver oil whereby the vitamin A content of the preparation can be enriched by the addition of fish liver oil.

A further object of my invention is a novel manner of treating animal liver for the separation therefrom of the vitamin A containing portions whereby the portions so separated out will possess strong anti-oxidant properties and, more particularly, a treatment which will separate out therewith anti-oxidant substances present in the liver.

A further object of my invention is a novel manner of treating whole animal liver for the extraction of the anti-anemic factors thereof so that the potency of the vitamin A contained in the residue will be retained substantially unimpaired.

A further object of my invention is a novel treatment of the water-insoluble portions of animal liver whereby these portions are reduced to a dry form which retains substantially the full vitamin A potency of the liver portions from which it is reduced and, more particularly, which retains also the anti-oxidant properties of these portions.

A further object of my invention is a novel manner of treating whole animal liver for the separation of the portions which contain the anti-anemic factors so that these portions so extracted will possess strong anti-oxidant properties.

My invention, in one of its aspects, revolves about my discovery of the presence in animal liver of a substance which possesses strong anti-oxidant properties. This discovery was made in connection with and as a result of my investigations of the properties and physio-chemistry of the reticulo-endothelial system of animal liver, about which I have contributed several scientific reports (see: Fifth International Congress of Radiology, Chicago, 1937, etc.).

It is a well-known fact that animal liver is rich in vitamin A; in fact, 92 per cent of all vitamin A in the body is stored in the liver. According to Thomas Moore (Bioch., J., 31:1937), McCoord (J. Nutrition, 7:557, 1934), Guilbert and Hart (J. Nutrition, 10:409, 1937) one gram of fresh animal liver contains from 100 to 500 USP units of vitamin A per gram. The amount of vitamin A stored in the liver varies not only with species of animal but with their diet as well. The stores of vitamin A in the liver of animals can reach much higher levels when their food contains sufficient amount of pro-vitamin A. The striking fact is that this large amount of vitamin A is perfectly protected from oxidation in spite of the fact there is present in liver an oxidizing activity of enzymes. This fact attracted my particular attention as suggestive of the presence in the liver of a very powerful anti-oxidant.

It was recently established that vitamin A is stored in the liver in the so-called Kupffer cells which are part of the reticulo-endothelial system of organism. Kupffer cells are particularly rich in lipides and in other complex fatty substances, which collaborate with vitamin A in the very complicated fat metabolism of the body. It was my assumption that the anti-oxiants of liver must be present particularly in the Kupffer cells.

My laboratory experiments with fresh liver gave indications that not only all vitamin A of liver but as well as anti-oxidant substances of it are contained in the water-insoluble portion of the liver.

I have succeeded (a) in separating out from whole animal liver the vitamin A containing portions thereof (the water-insoluble portions of the liver) with the vitamin A potency diminished little if any; (b) in separating out therewith the anti-oxidant substances present in the liver; (c) in reducing these portions, so separated out, to a dry form without substantial loss of vitamin A potency or of its anti-oxidant properties. I thus attain some of the major objects of my invention. For example, four pounds of fresh ox liver, treated in accordance with my procedure shortly to be described, gave a residue of approximately one pound in weight when dried and when tested was found to contain from 600,000 to 800,000 USP units of vitamin A. This powder retained its vitamin A content for the relatively long period of four to five months without appreciably losing its vitamin A. In another test I obtained a powder which contained 42,860 USP units of vitamin A per ounce. No anti-oxidants or preservatives were added. Four months later the same powder, kept at room temperature in wooden boxes, showed 39,050 units per ounce, a loss of only about 8 per cent of vitamin A in four months, although unprotected from air oxidation.

I am aware of the fact that liver is rich in lecithin which is an anti-oxidant. As a matter of fact, the powder of the above tests contained about 0.3 per cent of lecithin. I was, however, able to prove that the anti-oxidant properties of liver residue powder prepared according to my procedure can be only partially attributed to lecithin. The following experiment demonstrated this fully:

I prepared an artificial carrier using other material than liver residue. I added the exact amount of lecithin as it was naturally found in liver residue: 0.3 per cent. Then I added a fish liver oil concentrate of 41,100 units of vitamin A per ounce potency; in four weeks, this powder, kept in same condition as the liver residue, lost a large proportion of its vitamin A content. Its vitamin A content declined to 11,200 units. In another test the same amount of fish liver oil was added respectively to animal liver residue and to an artificial carrier, both of them containing the same percentage of lecithin. The first: vitamin A content of compound kept in open Petri dishes exposed to air at room temperature lost 19 per cent of vitamin A in 30 days. The second powder made with an artificial carrier, lost 49 per cent of its vitamin A in exactly the same condition. These experiments present convincing evidence that liver residue, in accordance with my teachings herein, contains an anti-oxidant other than lecithin.

My invention, in another of its aspects, revolves about my discovery that I can materially reduce the cost of my residue by integrating my procedure for the separation of the water-insoluble portions of the liver preparatory to further treatment, with and as part of the procedure for separating out the anti-anemic factor (water-soluble portions) in the preparation of liver extract.

It is the present general practice of meat-packing companies in the preparation of liver extract to separate out the anti-anemic factor (water-soluble portions of liver) from the water-insoluble portions (which contain vitamin A) in a manner that fails to conserve the potency of the vitamin A contained in the residue (the water-insoluble portions). The technique now generally employed in the meat-packing industry for the preparation of liver extract includes boiling and the use of atmospheric drying which, as I will later point out, leaves a residue which is almost entirely devoid of vitamin A. In this procedure the water-insoluble portions of the liver are regarded and treated as a byproduct of little value and sold for fertilizing purposes at a few cents a pound.

I have analyzed several samples of this byproduct residue supplied by a number of makers of liver extract. One of the samples showed only 343 vitamin A units per ounce, another 876 such units per ounce, whereas the residue separated out in accordance with my procedure shows an average of at least 35,000 such units per ounce. Furthermore, the aforementioned samples have shown upon analysis to possess no anti-oxidant properties.

When an enriched vitamin A powder was prepared using this residue of the commercial practice as a carrier for fish liver oil, the stability of the product in vitamin A was very low. From 3305 units per ounce the vitamin A potency of the powder was reduced to 289 in fifteen days when exposed to air in open Petri dishes.

My experience indicates that there is a definite cause and effect relation between the dissipation of the vitamin A potency and the destruction of the natural anti-oxidant present in liver, and the atmospheric dehydration at relatively high temperatures which characterize the procedure at present generally employed for preparing liver extract.

By employing my procedure for separating out the water-soluble portions of the liver for preparing liver extract, as a first step in obtaining a vitamin A containing preparation which attains the objects of my invention. I attain this further result: I am enabled to employ as the raw material for the production of my vitamin A containing preparation, a byproduct of the present commercial practice for making liver extract and which has little value at present.

My invention, in another aspect, revolves about the treatment of the water-insoluble portions of the liver when they are separated out, in order to reduce them to a dry form which retain most if not all of the original vitamin A potency of the liver and also its anti-oxidizing characteristics and here again I have found that there is a definite cause and effect relation between the successful attainment of such a product and the character of the temperature employed and the manner in which the residue is reduced to a powder form which I will make clear by reference to some of the experiments which I have performed.

In one experiment, for example, I have employed relatively high temperatures and dried the residue into a powder without vacuum. Upon analysis this residue was found to contain very little anti-oxidant properties.

In another of my experiments, I boiled macerated fresh pork liver for thirty minutes and then dried the residue in an atmospheric jacketed drier. Upon analysis the vitamin A content of the dried residue was found to be low. Instead of the usual figure of from 40,000 to 50,000 units per ounce, it showed only 1,109 USP units per ounce. I then enriched this dried residue of the second mentioned experiment, with fresh liver oil to the extent that one gram contained 3,980 units of vitamin A and then exposed the enriched powder to the air. It showed very poor stability as far as the vitamin A potency is concerned. In fifteen days the potency of this powder was reduced to 598 units per gram, thus showing a potency loss of about 85 per cent of vitamin A.

These observations indicate the significance of my procedure for the treatment of animal liver to separate out the water-soluble portions and the water-insoluble portions and also to reduce the latter to a dry vitamin A containing preparation which retains the full vitamin A potency of the liver as well as its anti-oxidant characteristics.

My invention, in another of its aspects, revolves about the production of a suitable and effective carrier for vitamin A containing substances such as fish liver oil. This I attain from the water-insoluble tissue of liver substance and my aforementioned procedure for separating out and treating this water-insoluble portion may be employed. I attain a vitamin A containing product which can serve also as a carrier for and whose vitamin A potency can be enriched by the addition of fish liver oil. Reference has already been made to the fact that by this procedure there is retained the anti-oxidant substances present in animal liver. These substances will serve to preserve also the vitamin A potency of the fresh liver oil with which the carrier is enriched.

I shall now proceed to set forth exemplifying procedures whereby my invention may be practised. I will do so by setting them forth as continuous proceduers and as continued until a final end product is arrived at which attains all the objects of my invention in minimum time and with minimum delay. It will be understood, however, that at intermediate points in this procedure there are produced products which of themselves may serve as end products and which attain some of these objects. For this reason I will make this disclosure by reference to the increments of which my procedure is comprised. These are:

A. Treating animal liver to separate out the water-soluble portions thereof for the preparation of liver extract and the water-insoluble portions thereof as a residue which contains all the vitamin A potency and anti-oxidant characteristics of the animal liver.

In commercial practice, this treatment will probably be done by the liver extract manufacturer in which event the residue may be considered as a byproduct of such manufacture.

B. Treating the residue to reduce it to a dry form (powder) which retains the vitamin A potency and the anti-oxidant characteristics of the animal liver.

C. Treating the powder to enrich its vitamin A potency by the addition of a vitamin A containing substance such as fish liver oil.

EXEMPLIFYING PROCEDURE No. 1

(1-A)

1. Pork or beef liver (preferably whole fresh, and generally in a frozen state) is first reduced to an emulsion. While this may be effected in many ways, I have found the following practice as entirely satisfactory for my purposes: the liver is finely macerted and warm water of a temperature of about 60° C. is added to expedite the procedure by accelerating complete diffusion and breaking down the particles so that they can more readily be put in solution. I have found that after about 20 minutes the batch is ready for the next treatment.

2. A small amount of lactic acid is then added to the emulsion to facilitate the osmotic process and thus accelerate the liberation of the water-soluble portions. The amount of lactic acid which it is advisable to use will vary with conditions. I have found, for example, that as little as .1 of one per cent of lactic acid by weight will be sufficient in a number of cases, although in other cases a somewhat increased amount may be necessary.

3. The emulsion is then subjected to a separation action so that the water-soluble portions and the fluid which contains them are removed as by filtration or pressure or the like to leave the residue (the water-insoluble portions) to which further reference will also be made shortly. The water-soluble portions which are removed contain the anti-anemic factors which have been extracted from the liver. It will be here pointed out that the lactic acid originally added to the emulsion will be found distributed both in the residue and in the water-soluble portions which have been removed. The benefits accruing from this will be pointed out shortly.

A factor in determining the amount of lactic acid which it is advisable to employ where the extraction of the anti-anemic factor forms part of the process, is the ultimate commercial form which these factors are to take. When these factors are in liquid form more lactic acid should be used as a preservative for the liquid form of the liver abstract. It can be stated that .2 of one per cent will ordinarily serve, and that it may be as low as .1 of one per cent or even as high as one per cent or even somewhat higher.

(1-B)

4. The mixture left after the removal of the water-soluble portions and the fluid which contain them, is subjected to a heat treatment in a boiler filled with a gas such as nitrogen or carbon dioxide. In this treatment, heat is applied for about ten minutes to cause the mixture to approach but not reach the boiling point and the mixture is then allowed to simmer for another one and a half or two hours depending upon the character of the raw material.

5. Separate out the liquor to leave a residue.

6. This residue is dried in vacuo in a gaseous atmosphere such as nitrogen or carbon dioxide at the relatively low temperature of, for example, 100° to 110° F. The procedure here is first to create the vacuum, then introduce a small quantity of nitrogen, for example, which is left there for about ten minutes. The nitrogen is then evacuated and a quantity of fresh nitrogen introduced and retained again for a period of ten minutes. This procedure is repeated over a period sufficient to complete the drying process. I find that this can be done generally in three to four hours. The time required will vary somewhat with conditions.

7. When residue is dry, calcium phosphate tribasic may be added in a small amount as for example, in the proportion of ½ to 1 per cent by weight to keep the residue dry.

The product resulting from this specific practice is a dried extracted liver residue and is in the form of powder. This powder comprises vitamin A, anti-oxidant factors, fatty substances and other factors which may play a role in vitamin A metabolism in animals. It also contains a fibrous substance. The net cost of this product, as calculated by me after evaluating the anti-anemic factor, should not exceed six or seven cents per pound.

(1-C)

Reference has already been made to the fact that this residue is comprised of a substantial amount of fibrous substance. This I have found has a high capacity for absorbing oil and therefore its presence renders the residue peculiarly adaptable to serve as a carrier for fish liver oil. It is, therefore, a further object of my invention that this capacity for absorption of fish liver oil be availed of to enrich the vitamin A content of the powder and increase its vitamin A potency by the incorporation of such oils therein, and where expense is a factor such enrichment may be effected by the addition of fish liver oil of low vitamin A potency which is inexpensive.

The presence of anti-oxidant factors in the residue make it particularly valuable as a carrier for fish liver oil since the retained anti-oxidant factors will preserve the vitamin A of the fish liver oil.

The dry residue arrived at by the procedure set forth above in (1-A) and (1-B) has a distinctly meaty taste because of the presence of the animal liver tissue. This meatiness has the capacity of suppressing, as it were, the fishiness of the added fish liver oil. I have found that where this powder, as derived from the water-insoluble residue of animal livers, is used as a carrier within rational limits, the absorbed fish oil partially loses its fishy taste and the powder containing the absorbed fish oil has the usual "meaty" taste and can therefore be used for fortification of food. Therefore, the preferred proportioning of the fish liver oil and the dry preparation to which it is added, should reflect the degree of the fishiness of the fish liver oil which it can generally be stated is more intense in commercial fish liver oils of low vitamin A potency. I find that I attain a major objective by using a fish liver oil of lower vitamin A potency because I thereby get an increased vitamin A potency at a minimum cost.

Reference has been made above to the fact that the vitamin A content of the water-soluble portion of the liver residue after proper drying should contain about four times the vitamin A potency of the same weight of fresh liver, and it will be assumed for purposes of disclosure that the vitamin A content of the fresh ox liver is such that one pound of the water-insoluble portion of the dried liver residue after proper preparation will contain from 500,000 to 800,000 USP units.

One practice whereby I employ the water-insoluble portions of the liver as a carrier for fish oil and thereby enrich its vitamin A content will be exemplified again for one pound of residue as follows:

8. To one pound of dried liver residue preferably reduced to a powder form in a manner above set forth, and assumed to contain approximately 800,000 (arrived at from an analysis of the residue) USP units, I add, for example, 50 grams of low potency fish liver oil of an assumed vitamin A potency of 10,000 USP units per gram.

9. This mixture is then dried in a vacuum for a short period of time, such as fifteen to twenty minutes, to give a preparation which contains a vitamin A potency of approximately 2,900 units per gram.

Actual tests made by me have shown that vitamin A potency of the resulting product measures up to that calculated immediately above, thus proving that my process retains and conserves the full vitamin A potency of both of the residue and the fish liver oil.

The proportions by weight of the residue and fish liver oil can be varied at will within limits, for the attainment of the general objects of my invention. For example, by using a fish liver oil of the slightly higher vitamin A potency of 15,000 units per gram, I require only 35 grams of the fish liver oil to attain a vitamin A potency for the entire preparation which also approximates 2,900 USP units per gram.

I have found that with a proportionality of the order set forth above as between the weight of the absorbed fish liver oil and the carrier, I arrive at a vitamin A containing powder enriched by fish oil which is substantially tasteless.

The fish liver oil added to residue which, as stated, may or will be reduced to the form of a powder, serves additionally to coat the vitamin A content of the residue with an oil film to thereby function as a physical preservative of the vitamin A contained in the residue.

EXEMPLIFYING PROCEDURE No. 2

(2-A)

The liver is treated to separate out the water-soluble and the water-insoluble portions thereof in a manner to obtain the objectives of my invention with reference thereto and the treatment set forth under (1-A) of Exemplifying procedure No. 1 will serve equally well for this alternative procedure.

(2-B)

The moisture of the water-insoluble portions of liver is reduced to 8 or 10 per cent by drying it in an atmosphere of nitrogen, carbon dioxide or the like to give a dry residue, for example, in the manner set forth in paragraph numbered "4" under (1-B) of "Exemplifying procedure No. 1."

(2-C)

Fish liver oil, preferably of low concentration where cost is the critical factor, is added to the residue of the animal liver in the exemplary proportion of 1 to 15 by weight and the mass is carefully mixed.

(2-D)

This mass is again dried in vacuo at a low temperature of 85° to 90° F. until the moisture is reduced to 5 or 6 per cent (of residue).

(2-E)

Calcium phosphate tribasic is then added in a small amount as, for example, in the preparation of ½ to 1 per cent by weight.

The end product is a powder of 3,000 to 10,000 units of vitamin A per gram or higher, according to the potency of the fish liver oil which has been admixed, a powder very stable as far as vitamin A is concerned, due to the anti-oxidant properties of the powder.

Having thus described my invention and illustrated its use, what I claim as new and desire to secure by Letters Patent is:

1. An edible preparation in dry powder form containing vitamin A in which the stability of vitamin A potency is relatively high, said preparation comprising the residue of the water insoluble constituents of macerated animal livers remaining after extraction of water and water soluble constituents, said water insoluble constituents including substantially all of the vitamin A content, substantially all of the anti-oxidant factors, substantially all of the fatty substance and substantially all of the fibrous substance of the livers from which such constituents were derived.

2. An edible preparation in dry powder form containing vitamin A in which the stability of vitamin A potency is relatively high, said preparation comprising the residue of the water insoluble constituents of macerated animal livers remaining after extraction of water and water soluble constituents, said water insoluble constituents including substantially all of the vitamin A content, substantially all of the antioxidant factors, substantially all of the fatty substance and substantially all of the fibrous substance of the livers from which such constituents were derived, said residue having its vitamin A content enriched by the addition of fish liver oil, said oil being retained in said fibrous substance by absorption into said fibrous substance and rendered substantially tasteless and relatively stable by such absorption.

3. A process for producing an edible preparation in dry powder form in which the stability of vitamin A potency is relatively high, comprising macerating animal livers, extracting the water soluble constituents by mixing the macerated livers with warm water and separating the fluid from the residue of water insoluble constituents, and drying the residue of water insoluble constituents in vacuo at a relatively low temperature.

4. A process for producing an edible preparation in dry powder form in which the stability of vitamin A potency is relatively high, comprising macerating animal livers, extracting the water soluble constituents by mixing the macerated livers with warm water in the presence of lactic acid and separating the fluid from the residue of water insoluble constituents, and drying the residue of water insoluble constituents in vacuo at a relatively low temperature.

5. A process for producing an edible preparation in dry powder form in which the stability of vitamin A potency is relatively high, comprising macerating animal livers, extracting the water soluble constituents by mixing the macerated livers with warm water and separating the fluid from the residue of water insoluble constituents, drying the residue of water insoluble constituents in vacuo at a relatively low temperature, and enriching said residue by adding fish liver oil to said residue of water insoluble constituents for absorption thereby.

BORIS TH. SOKOLOFF.